(12) United States Patent
Bangalore et al.

(10) Patent No.: US 7,634,494 B2
(45) Date of Patent: Dec. 15, 2009

(54) FLASH MEMORY DIRECTORY VIRTUALIZATION

(75) Inventors: Kiran Kumar G. Bangalore, Folsom, CA (US); Patrick C. McGinty, Rancho Cordova, CA (US); William J. Tiso, Jr., Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 11/120,926

(22) Filed: May 3, 2005

(65) Prior Publication Data

US 2006/0253484 A1 Nov. 9, 2006

(51) Int. Cl.
G06F 17/30 (2006.01)
G06F 12/00 (2006.01)

(52) U.S. Cl. ...................................... 707/102; 711/103

(58) Field of Classification Search .................... 707/9, 707/10, 102, 200, 202, 204, 205; 711/103, 711/205
See application file for complete search history.

(56) References Cited

U.S. PATENT DOCUMENTS

| | | | | |
|---|---|---|---|---|
| 5,404,485 A * | 4/1995 | Ban | ............................ | 711/202 |
| 5,544,356 A * | 8/1996 | Robinson et al. | ............ | 707/205 |
| 5,566,314 A * | 10/1996 | DeMarco et al. | ............ | 711/103 |
| 5,592,669 A * | 1/1997 | Robinson et al. | ............ | 707/206 |
| 5,630,093 A * | 5/1997 | Holzhammer et al. | ....... | 711/115 |
| 5,754,817 A * | 5/1998 | Wells et al. | .................. | 711/203 |
| 5,787,445 A * | 7/1998 | Daberko | ..................... | 707/205 |
| 5,822,562 A * | 10/1998 | Dahlen et al. | ................ | 711/170 |
| 5,978,808 A * | 11/1999 | Wells et al. | .................. | 707/100 |
| 5,987,478 A * | 11/1999 | See et al. | ..................... | 707/205 |
| 6,075,858 A * | 6/2000 | Schwartzman | ............... | 705/52 |
| 6,167,338 A * | 12/2000 | De Wille et al. | ............... | 701/51 |
| 6,275,421 B1 * | 8/2001 | Chen et al. | ............. | 365/189.06 |
| 6,647,496 B1 * | 11/2003 | Tagawa et al. | ............... | 713/193 |
| 6,732,222 B1 * | 5/2004 | Garritsen et al. | ............ | 711/103 |
| 6,742,078 B1 * | 5/2004 | Chien et al. | .................. | 711/103 |
| 6,928,511 B2 * | 8/2005 | Chiu | ........................... | 711/103 |
| 6,976,133 B1 * | 12/2005 | Wynn et al. | ................... | 711/147 |
| 7,057,942 B2 * | 6/2006 | Suda et al. | ............. | 365/189.01 |
| 7,124,302 B2 * | 10/2006 | Ginter et al. | ................. | 713/189 |
| 7,356,641 B2 * | 4/2008 | Venkiteswaran | ............. | 711/103 |
| 7,373,521 B1 * | 5/2008 | Kawahara | .................... | 713/193 |
| 7,386,700 B2 * | 6/2008 | Lasser | ......................... | 711/202 |
| 7,426,623 B2 * | 9/2008 | Lasser | ......................... | 711/170 |
| 2002/0055942 A1 * | 5/2002 | Reynolds | ..................... | 707/200 |
| 2002/0161860 A1 * | 10/2002 | Godlin et al. | ............... | 709/219 |
| 2003/0009538 A1 * | 1/2003 | Shah et al. | ................... | 709/219 |
| 2003/0041222 A1 * | 2/2003 | Akey et al. | ................... | 711/165 |
| 2003/0065899 A1 * | 4/2003 | Gorobets | ..................... | 711/165 |
| 2003/0200232 A1 * | 10/2003 | Matsuoka et al. | ........... | 707/200 |
| 2003/0200452 A1 * | 10/2003 | Tagawa et al. | ............... | 713/193 |
| 2004/0010681 A1 * | 1/2004 | Lee | ................................ | 713/2 |
| 2004/0177214 A1 * | 9/2004 | Chiu | ........................... | 711/103 |

(Continued)

Primary Examiner—Neveen Abel Jalil
Assistant Examiner—Tarek Chbouki
(74) Attorney, Agent, or Firm—Trop, Pruner & Hu, P.C.

(57) ABSTRACT

Directory virtualization may be achieved in semiconductor memories, such as flash memories, by providing a system in which files and directories are interchangeable. A directory may be stored at a virtual address which points to various files. From the user perspective, a tree hierarchy may be achieved. From a hardware standpoint, a series of entries in a table may be linked together by various pointers.

5 Claims, 5 Drawing Sheets

U.S. PATENT DOCUMENTS

| | | | |
|---|---|---|---|
| 2004/0193864 A1* | 9/2004 | Tsai et al. | 713/1 |
| 2004/0199712 A1* | 10/2004 | Garritsen et al. | 711/103 |
| 2004/0225844 A1* | 11/2004 | Thompson et al. | 711/145 |
| 2005/0065946 A1* | 3/2005 | Shao-Hong et al. | 707/100 |
| 2005/0083794 A1* | 4/2005 | Tagawa et al. | 369/30.08 |
| 2005/0132129 A1* | 6/2005 | Venkiteswaran | 711/103 |
| 2005/0192686 A1* | 9/2005 | Hirota et al. | 700/94 |
| 2005/0193161 A1* | 9/2005 | Lee et al. | 711/103 |
| 2005/0195283 A1* | 9/2005 | Sakuda et al. | 348/207.99 |
| 2005/0237566 A1* | 10/2005 | Sakuda et al. | 358/1.15 |
| 2006/0026341 A1* | 2/2006 | Lasser | 711/103 |
| 2006/0075395 A1* | 4/2006 | Lee et al. | 717/168 |
| 2006/0101408 A1* | 5/2006 | Kotamarthi et al. | 717/126 |
| 2006/0161726 A1* | 7/2006 | Lasser | 711/103 |
| 2006/0184718 A1* | 8/2006 | Sinclair et al. | 711/103 |
| 2006/0224815 A1* | 10/2006 | Yamada et al. | 711/6 |
| 2006/0224817 A1* | 10/2006 | Atri | 711/103 |
| 2007/0014136 A1* | 1/2007 | Ali et al. | 365/1 |
| 2007/0118730 A1* | 5/2007 | Platt | 713/2 |
| 2008/0034406 A1* | 2/2008 | Ginter et al. | 726/2 |
| 2008/0071978 A1* | 3/2008 | Chow et al. | 711/103 |
| 2008/0228300 A1* | 9/2008 | Tagawa et al. | 700/94 |

* cited by examiner

FLASH MEMORY DIRECTORY VIRTUALIZATION

BACKGROUND

This invention relates generally to file systems for semiconductor memories.

Semiconductor memories, such as flash memories, include flash file systems that maintain a series of tables for each directory. The tables contain the contents of each directory, including files and other directories that are updated when the files and directories are added to and removed from the tables.

Reads and writes to a flash memory array tend to be relatively slow processes. Thus, each time data is accessed from the array, both the array and a file system may be accessed. Thus, to access the file, the file system must be accessed, the file located, and then the file accessed. This involves multiple reads which, over time, tend to be cumbersome and inefficient, especially for deep paths and for those directories that contain a large number of files.

DETAILED DESCRIPTION

Figure 1:
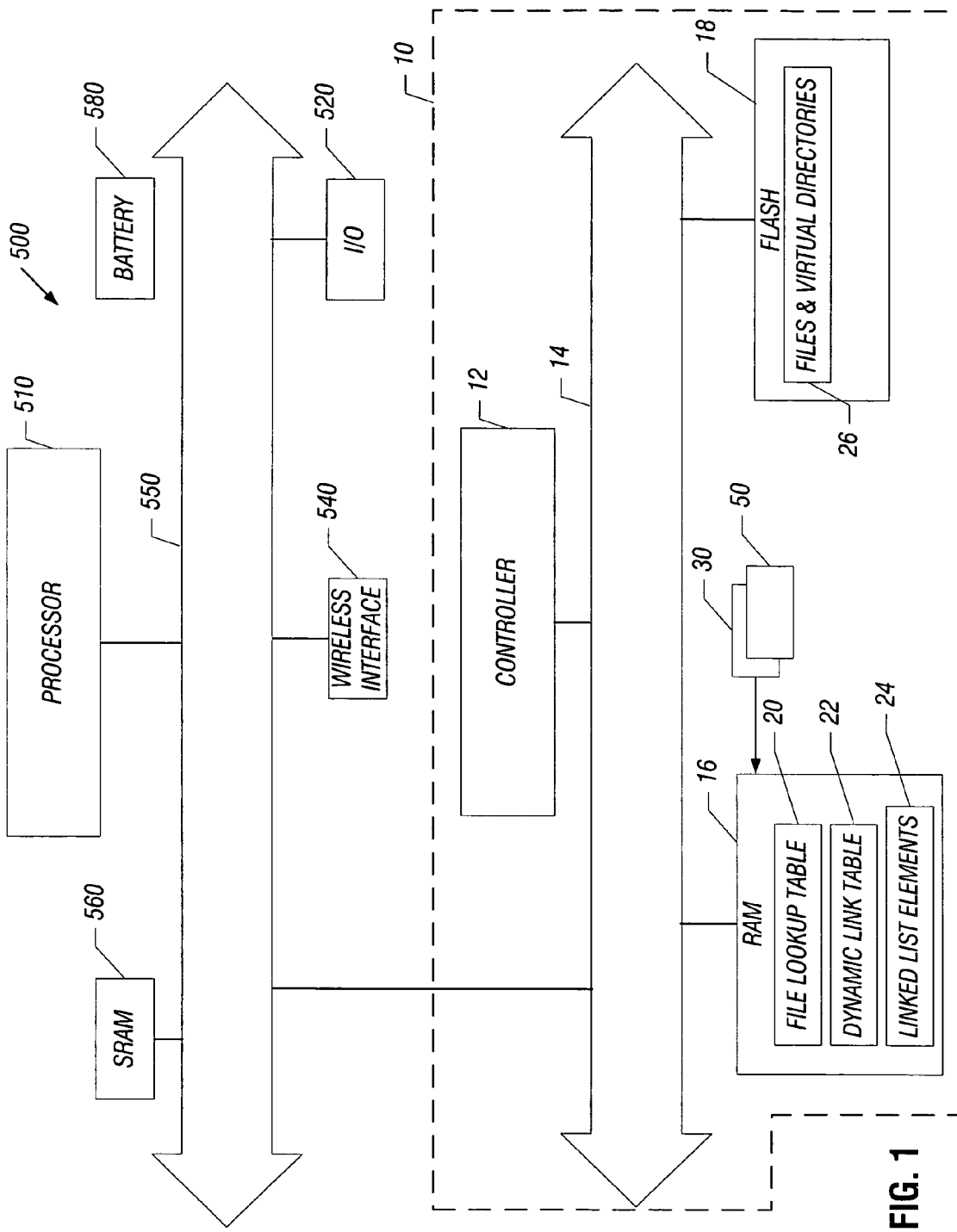
FIG. 1 is a system depiction of one embodiment of the present invention.

Referring to FIG. 1, a processor-based system 500 may be any conventional processor-based system, commonly called a computer, including a laptop computer, a desktop computer, a personal digital assistant, a server, a set top box, a cellular telephone, a mobile device, a digital camera, or a multimedia system. The present invention is not limited to any particular application or any particular system architecture.

The system architecture may include a processor 510. The processor 510 may be one or more microprocessors in some embodiments of the present invention. The processor 510 is coupled by a bus 550 to other components such as a static random access memory (SRAM) 560, a wireless interface 540, and an input/output device 520. The wireless interface 540 may be a device that facilitates wireless communications over a radio frequency link in some embodiments. The wireless interface 540 may, for example, include a dipole antenna. In some embodiments, the wireless interface may facilitate cellular communications. The input/output device 520 may be any conventional input/output device including a display, a keyboard, a mouse, a keypad, or a touch screen, to mention a few examples.

In one embodiment of the present invention, the system 500 is an embedded multimedia system for multimedia applications such as playing video or audio. In some embodiments, the system 500 may be mobile and may be powered by a battery 580. However, the invention is not limited to any particular application and is equally applicable to wired, wireless, mobile, and fixed applications.

Coupled to the bus 550 is a flash memory 10. The flash memory 10 may include a bus 14 that couples a controller 12. The memory 10 may, for example, be a NOR flash memory. The controller 12 may be an embedded controller, in one embodiment. It may be a microprocessor, or some other controller in some embodiments of the present invention. The bus 14 may couple a separate random access memory 16. The memory 16 may store a file lookup table 20, a dynamic link table 22, and link list elements 24. These constituents may implement a virtual directory system. Also stored on the random access memory 16 may be software 30 and 50. The software 30 and 50 may be used to implement a virtual directory. Also coupled to the bus 14 is a flash array 18 which may store files and virtual directories, among other things.

Figure 2:
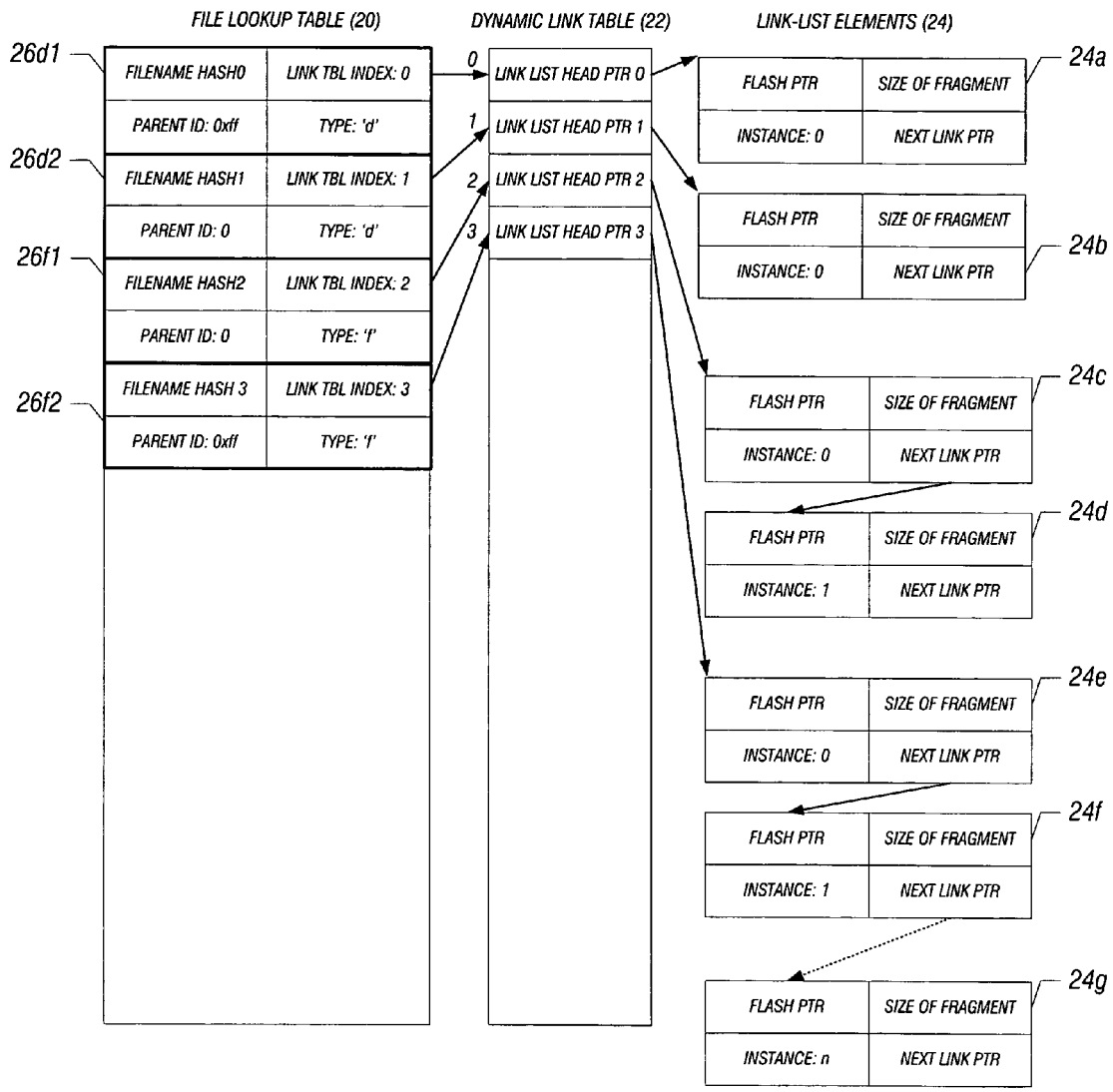
FIG. 2 shows the interaction between the file lookup table, dynamic link table, and link list elements shown in FIG. 1 in accordance with one embodiment of the present invention.

FIG. 2 illustrates the interaction between the file lookup table 20, dynamic link table 22, and link list elements 24, stored in the memory 16 shown in FIG. 1. The file lookup table 20 may be associated with each file or directory stored in the flash array 18. For example, the file entries 26f1 and 26f2 may be indicated by a file type indication of f in the box associated with the lower right quadrant. Another field associated with each file 26f1 and 26f2 is the file name hash. The file name hash may be a shortened form of the file name. For example, where the file name is a relatively long string, the file name hash may be a relatively short number. In addition, an identifier for the parent file from which the file depends may be provided, as well as a link table index.

One or more directories 26d1 and 26d2 may be stored in the file lookup table 20. The directories 26d1 and 26d2 may be handled in the same fashion as files 26f1 and 26f2. They may include the same organization, except that their lower rightmost field, as depicted in FIG. 2, may indicate a type d for directory. While four items have been discussed, including two files and two directories, a large number of files and directories may be stored in the file lookup table 20.

The dynamic link table 22 is pointed to by the link table index field associated with each file 26f and each directory 26d. For example, the directory 26d1 has a link table index zero which points to a link list pointer zero in the dynamic link table 22, as indicated by the arrow extending from the file lookup table 20, and the directory 26d1, to the link list header pointer zero in the dynamic link table 22. Similarly, the directory 26d2 points to the link list header point number one, the file 26f1 points to the link list header pointer two, and the file 26f2 points to the link list header pointer three.

Each of the pointers in the dynamic link table 22 then point to a link list element 24. In some embodiments not depicted, the file lookup table 20 may point directly to the link list elements 24, eliminating the dynamic link table 22. For example, in the depicted embodiments, the link list header pointer zero points to the link list elements 24a, which includes a flash pointer, an instance, a fragment size, and a next link pointer field. In the case of the link list element 24a pointed to by the link list header zero, no further elements are pointed to. Similarly, the link list header pointer one points to the link list element 24b. The link list head pointer two points to the link list file element 24c which, in turn, points to the link list element 24d. The link list head pointer three points to the link list element 24e which, in turn, points to the element 24f, which may point to any number of additional elements, including the element 24g.

The file lookup table 20 caches file name hash values for each file and directory in the managed flash volume. It caches identifiers and parent identifiers for each file and directory in the volume. Finally, the file lookup table 20 maintains a type for each item that denotes whether it is a file or directory.

The dynamic link table 22 maintains a pointer to the head element for a specific file or directory's link list elements 24. The link list elements 24 cache a pointer to the physical data address and flash.

The link list elements 24 maintain a size of the fragment/metadata structure for efficient calculations. The size information may be used to locate file metadata, such as the file name, for comparison to the file name hash value. The size information can also be used, for example, in power on recovery to find the full sized file. The metadata may include file data or data pointers, and may be located at the head of a link list element 24.

The elements 24 may also include a field that maintains an instance number to denote a fragmentation sequence. In one embodiment, files and directories may be fragmented and stored more efficiently in non-contiguous regions within the array 18. The fragmentation sequence enables the fragments to be located and re-assembled from its fragments.

Finally, the element 24 may include a pointer to the next linked element. Thus, as illustrated in FIG. 2, the element 24*c* has a pointer that points to instance one and an element 24*d*.

Figure 3:
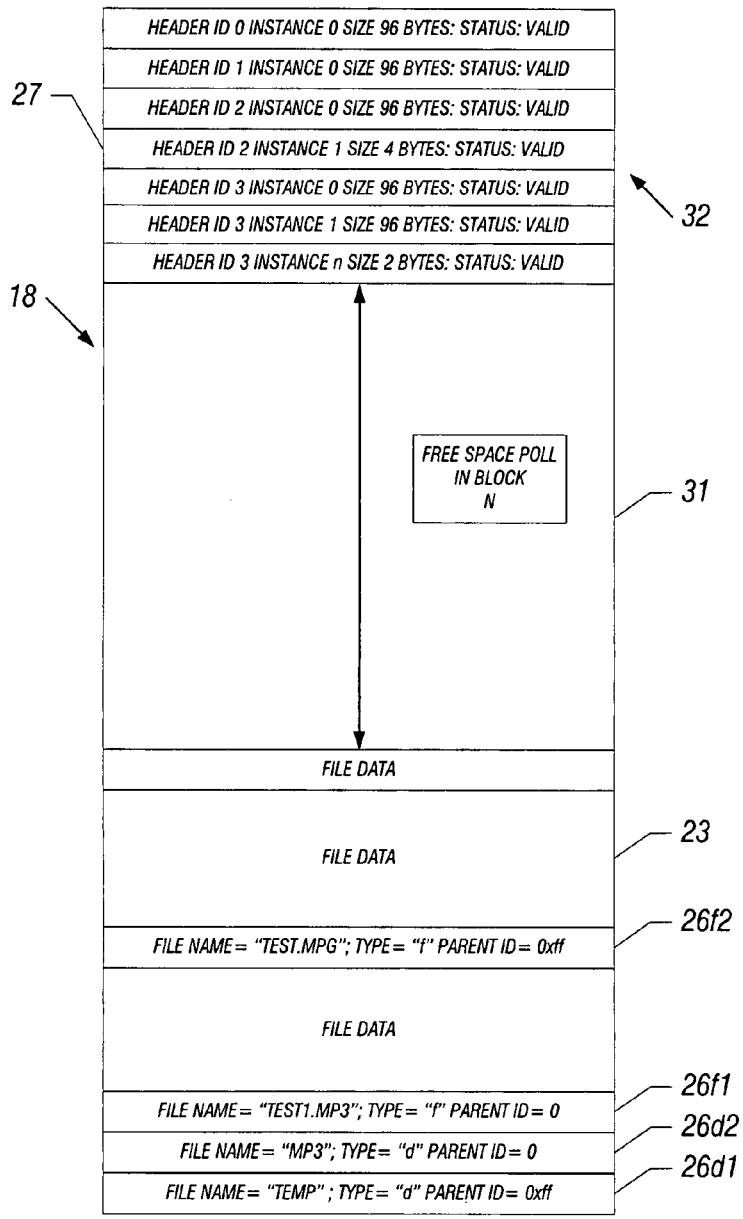
FIG. 3 is a depiction of a flash memory array in accordance with one embodiment of the present invention.

Referring to FIG. 3, the physical layout of the flash memory array 18 may include files, directories, and headers. The headers 27 may be provided at the upper end 32 of the array 18 and may be associated with each of the files and directories therein. The header may give an identifier, an instance number, a size, and a status. Headers may be stored in the array 18, in some embodiments, for power on recovery. Without the headers (in addition to the file system in random access memory) data might be lost on a power failure. However, the amount of data retained in the header may be reduced by virtue of having the random access memory based file system.

A free pool of space in block N 31 may be provided over the file data 23. Included within the file data is the file 26*f*2, the file 26*f*1, the directory 26*d*1, and the directory 26*d*2.

Figure 4:
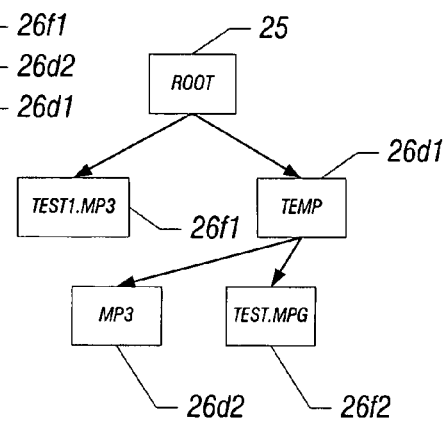
FIG. 4 is the depiction of the logical layout of the files and directories shown in FIG. 3 in accordance with one embodiment of the present invention.

As shown in FIG. 4, the physical layout of files and directories is logically interpreted and presented to the user in a hierarchal or tree arrangement. Moving from a root 25 branch, the file 26*f*1 and the directory 26*d*1 are branches. From the directory 26*d*1, branch the directory 26*d*2 and the file 26*f*2.

Figure 5:
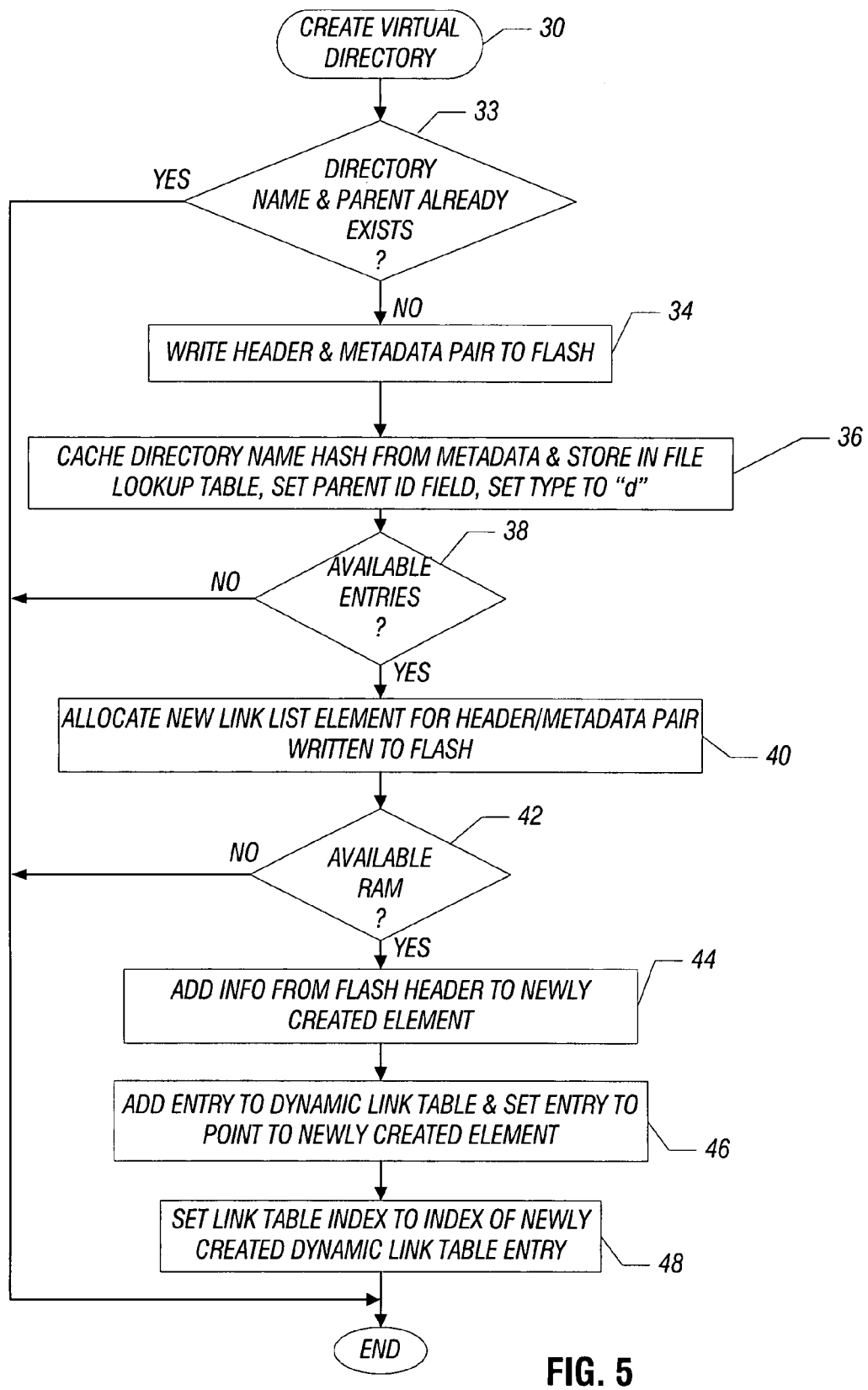
FIG. 5 is a flow chart for software for creating virtual directories in accordance with one embodiment of the present invention.

The virtual directory system may be set up using the software 30, shown in FIG. 5, in accordance with one embodiment of the present invention. While the software 30 is shown as being stored in the random access memory 16, it may also be stored and in the other memory associated with the system 500. It may be implemented as software, firmware, or microcode.

Initially, the file lookup table 22 is scanned to check for any instance of a new directory of the same file name with the same parent (diamond 33). If such a file exists, the flow ends. Otherwise, a header and metadata pair are written to the flash memory array 18 as indicated in block 34. The headers 27 may be written in a list, one after another, while the metadata in the region 22 may be written from the bottom up, in one embodiment. Thus, the uppermost header (with header ID O) is the header for the lowermost metadata (File name =temp). Together, the header and the metadata form a pair. The header may include an identifier (e.g., header ID O) and a fragmentation instance (e.g., instance O), a fragmentation size (e.g., 96 bytes) and a status (e.g., valid).

Then, the directory name hash from metadata is cached and stored into the file lookup table 20 as indicated in block 36. The parent ID field is set and the type is set to directory or d, as also indicated in block 36. A check at diamond 38 determines whether there is an available entry within the file lookup table 20 for this new item. Of course, as another alternative, data may be written first into the random access memory 16 and thereafter in the flash array 18.

If there is an available file lookup table 20 entry, a new link list element 24 is allocated for the header/metadata pair written to the flash memory array 18 as indicated in block 40. Then, a check at diamond 42 determines whether there is available RAM 16 that can be allocated for this entry. If so, the additional information from the flash header 27, in the array 18, is added to the newly created element 24 as indicated in block 44. The data needed to fill the fields in link list element 24 for the size of fragment and instance can be obtained from the header. The flash pointer and next link pointer can be calculated from a known offset in a block for each header and known start location for data. An entry is added to the dynamic link table 22 and the entry is set to point to the newly allocated element as indicated in block 46. Finally, the link table index of the file lookup table 20 is set to the index of the newly added dynamic link table 22 entry as indicated in block 48.

Figure 6:
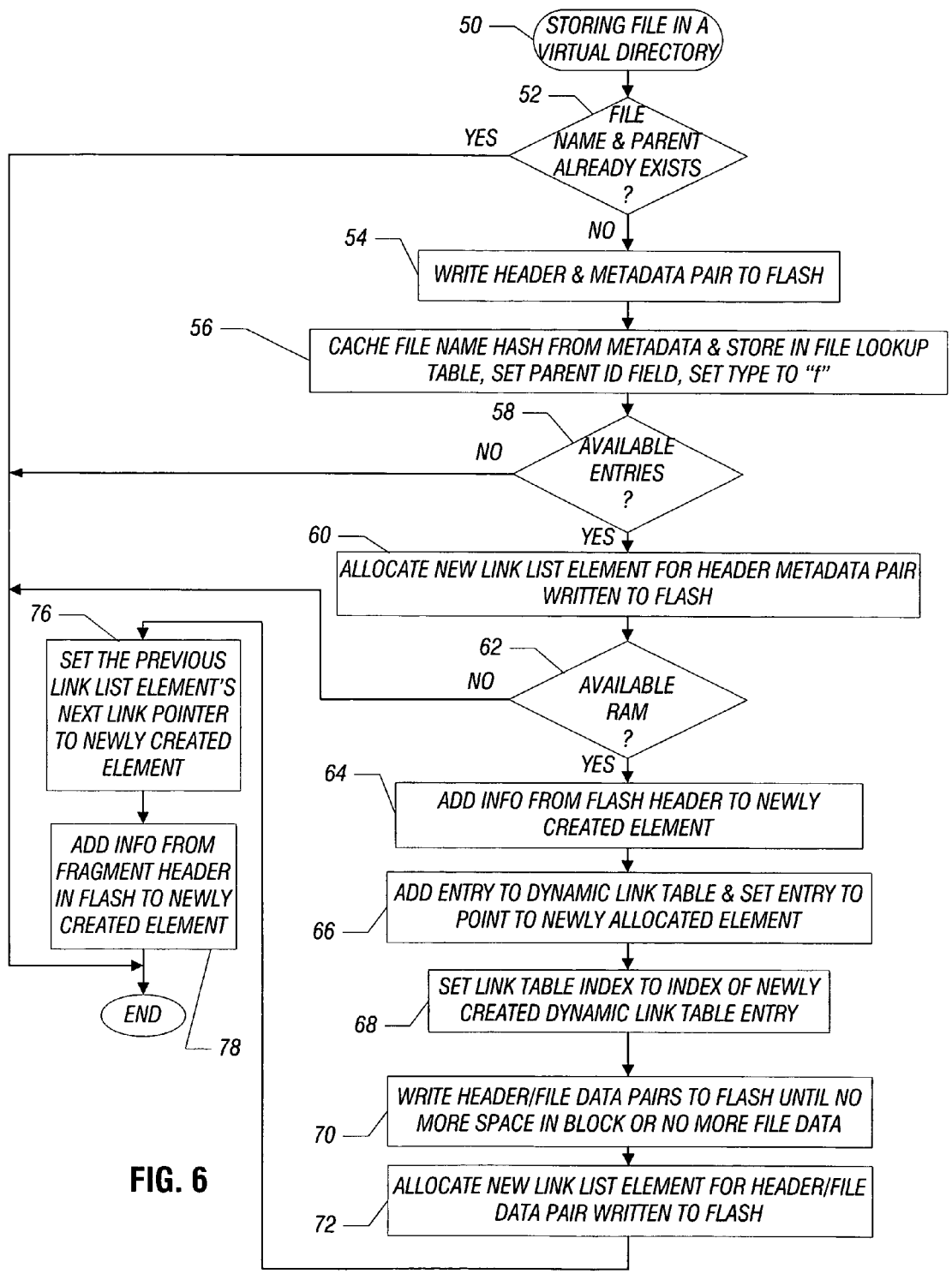
FIG. 6 is a flow chart for software for storing files in a virtual directory in accordance with one embodiment of the present invention.

To store a file in the virtual directory, the software 50 (FIG. 6) may be utilized. The software 50 may be stored on the random access memory 16. The software 50 may be implemented by microcode or firmware in some embodiments of the present invention.

As before, the file lookup table 20 is scanned, as indicated in diamond 52, to determine whether the table includes a file with the same name and parent already exists. If not, the header and metadata pair are written to the flash memory array 18 as indicated in block 54. The file name hash from metadata is cached and stored in the file lookup table 20. The parent ID field is set and the type is set to f as indicated in block 56.

A check at diamond 58 determines whether there are available entries within the table 20. If so, a new link list element 24 is allocated for the header/metadata pair written to the flash memory array 18 as indicated in block 60.

A check at diamond 62 determines whether there is available RAM space in the random access memory 16 as determined in diamond 62. If so, the information from the flash header is added to the newly created element as indicated in block 64. Then, in block 66, an entry is added to the dynamic link table 22 and the entry is set to point to the newly allocated element.

The link table index is set to the index of the newly created dynamic link table entry (block 68). This flow continues until no more data exists. The header/file data pairs are written to the flash array 18 until no more space on the block or no more file data is available as indicated in block 70. Then, the new link list element is allocated for the header/file data pair written to flash memory array 18 as indicated in block 72.

The previous link list element's next link pointer is set to the newly created element in block 76. Finally, the information from the fragment header in the flash memory array 18 is added to the newly created element as indicated in block 78.

In some embodiments of the present invention, the overhead of reads and writes to the flash memory array 18 may be reduced by creating virtual directories and files. The creation of a directory using a real directory implementation would involve the creation of data items that are generally cumbersome and inefficient for deep paths and those directories that contain a large number of files. Thus, in some embodiments, by directory virtualization, the standard deviation for directory creation time may be removed, which may be a large performance advantage over other directory implementations. Also, a virtual directory implementation based around zero byte files allows for a simple and efficient low level flash driver which can assume several key details about the data written. Thus, in some embodiments, directories may be treated as zero byte files.

By excluding the reading and writing to directory tables in flash, performance may be improved. More effective directory traversal may be achieved, in some embodiments, due to random access memory structures that contain critical file metadata. Significantly less system overhead may be used, in some embodiments, compared to other flash file systems. There may be fewer limitations in the usage model when compared to traditional flash file systems, in some embodiments, and the system may be fully power loss recoverable. In some embodiments, the data that forms the files and the directories is persistent upon asynchronous power loss once written to the managed flash area.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

storing a file lookup table for a flash memory array in a separate random access memory;

providing an entry in said file lookup table associated with each file or directory in said flash memory array, said flash lookup table storing a shortened file name and a link table index;

providing a dynamic link table in said separate random access memory, said dynamic link table pointed to by said link table index, said dynamic link table pointing to a link list element;

maintaining a link list element in said separate random access memory, said link list element pointing to physical data in said flash memory array;

storing actual files and directories in said flash memory array and storing data, to enable said actual files to be accessed, in said random access memory, each file and directory having an entry in said table;

storing file system data in said random access memory and said flash memory array; and storing less file system data for each file in said flash memory array than is stored in said random access memory.

2. The method of claim 1 including enabling directories to point to files.

3. The method of claim 1 including populating a file system for the flash memory array using information obtained from a header within said flash memory array.

4. The method of claim 1 including providing the shortened file name in said random access memory which is translatable into a file name for a file stored in said flash memory array.

5. The method of claim 1 including enabling a file to be fragmented into portions, identifying said portions, and providing instance identifiers so that said portions can be accessed from data stored in said random access memory.

* * * * *